US005940078A

United States Patent [19]

Nagarajayya et al.

[11] Patent Number: 5,940,078
[45] Date of Patent: Aug. 17, 1999

[54] METHOD AND APPARATUS FOR CHANGING THE APPEARANCE OF ICON IMAGES ON A COMPUTER DISPLAY MONITOR

[75] Inventors: Nagendra Nagarajayya, San Jose; Bangalore Madhuchandra, Milpitas, both of Calif.; Xavier de Saint Girons, Chambourcy, France; Vincent Vandenschrick, Antony, France; Thierry J. Lobel, St. Mande, France; Marc D. Moss, Fremont, Calif.; Fabrice Keller, Plaisir, France

[73] Assignee: Sun Microsystems, Inc., Palo Alto, Calif.

[21] Appl. No.: 08/877,138

[22] Filed: Jun. 17, 1997

[51] Int. Cl.[6] .................................. G06F 3/00; G06F 3/14
[52] U.S. Cl. ........................... 345/346; 345/348; 345/354
[58] Field of Search ....................................... 345/145, 334, 345/335, 339, 346, 348, 354, 355, 976

[56] References Cited

U.S. PATENT DOCUMENTS

| 5,432,903 | 7/1995 | Frid-Nielsen | 345/349 |
|---|---|---|---|
| 5,666,504 | 9/1997 | Crutcher | 345/349 |

OTHER PUBLICATIONS

Armstrong, Previewing the Common Control DLL for Microsoft Internet Explorer 4.0, part II. Microsoft Systems Journal, Nov. 1996, V11 N11 p. 19.

Bonner, On Windows, Computer Shopper, Apr. 1997 V16, N4, p. 307.

Flanagan, David, Java In A Nutshell, 2nd Edition, O'Reilly & Associates, Inc., Sebastapo, CA.

Kadel, Rich, Generic Client–Server Classes, Aug. 15, 1996, Internet:javaworld.com/javaworld.

Cameron, Jamie, JFS, Internet:jcameron @ letterbox1.com.

*Primary Examiner*—Raymond J. Bayerl
*Assistant Examiner*—Chadwick A. Jackson
*Attorney, Agent, or Firm*—Beyer & Weaver, LLP

[57] ABSTRACT

Methods and apparatuses for altering the appearance of an icon box when an event effecting the icon box occurs are disclosed. In one embodiment, a pointer entering an icon box or exiting an icon box is detected and an icon property is set accordingly. Also detected is an icon being set to activate its underlying function and the actual activation of an icon's underlying function. Another icon property is set based on whether an icon is set to be activated or has been activated. A repaint procedure is used to retrieve a new icon image and replace the image in the icon before the event occurred. The repaint procedure uses an icon label and the icon property states to determine which image to retrieve and place in the icon box. The repaint method retrieves an image from a plurality of images reflecting different states of the icon. The icon is also capable of communicating any events effecting it to its parent object, such as a toolbar, thereby allowing the parent object to behave in an appropriate manner.

11 Claims, 6 Drawing Sheets

140

210

220

230

METHOD AND APPARATUS FOR CHANGING THE APPEARANCE OF ICON IMAGES ON A COMPUTER DISPLAY MONITOR

BACKGROUND OF THE INVENTION

1. The Field of the Invention

The present invention relates generally to user interface software run on computers, and specifically to a method and apparatus for changing the image of an icon in a menu panel or toolbar according to a user's movements and actions of the pointer in relation to the icon.

2. The Relevant Art

With the advent of the graphical user interface (GUI) on computer systems came the increasingly common use of menu panels or toolbars to provide users with a menu shortcut by representing a menu choice graphically instead of through layers of text-based menus and submenus. A graphical representation of a menu choice is called an icon, which typically is a descriptive symbol representing an option or action, such as a print function or document formatting option. In some toolbars the icon is contained in an icon box which is also referred to as a button reflecting the fact that the user presses or "clicks on" that button when choosing that option or function.

With the increasing use of toolbars in computer applications and operating systems, display monitors now often contain several different toolbars at once. Toolbars are often positioned horizontally across the top or bottom of a display monitor or vertically along the left or right side of the monitor. Accompanying the increasing use of toolbars and menu panels is the growing practice of representing more functions and user options graphically. This is done to display to users as many choices as possible on the monitor through icons so the user will be aware through a constant visual reminder that the option exists. Also, as mentioned above, icons provide shortcuts to choosing those options, many of which are repetitive, by simply "clicking on" or pressing the right buttons. However, the result of this trend has been congested toolbars in which too many icon boxes are packed close together. The congestion within the toolbars is a result of the fact that space taken up by the toolbars on the display monitor must be limited so as not to take space away from the main or parent application which is the user's primary focus.

One result of the increasing use of icons and crowded toolbars is the difficulty in distinguishing which button the pointer is on. The user typically guides some type of pointer to the icon using a hardware interface device such as a mouse, roller ball, or track pointer. In addition, the icon boxes are static in that they do not change in anyway when the pointer is on them. In some applications, icon boxes show a slight change when the button is pressed or chosen by the user, but this change does not assist the user in determining which icon the pointer presently lies. The buttons do not change appearance and thus do not assist the user in distinguishing the icons or determining the location of the pointer.

What is needed is an improved method and apparatus for changing or altering the appearance of an icon box when a pointer moves in and out of the box and when the function or option represented by the icon is activated, thereby enabling the user to easily distinguish icon boxes when the pointer is in a toolbar and also providing icons with a sense of life that is visually appealing to users.

SUMMARY OF THE INVENTION

Accordingly, the present invention provides a method and apparatus for altering the appearance of an icon box to indicate that an event effecting the icon box has occurred allowing the user to easily distinguish in a way that is visually appealing which icon has been effected.

In one preferred embodiment, a method for detecting when an event effecting an icon box has occurred and changing the image in an icon box according to the event is disclosed. In this aspect of the invention, the system detects when a pointer enters or exits an icon box and sets a first icon box property to either an onbutton state or an offbutton state if the pointer enters or exits the icon box, respectively. The system also detects when the icon box is set or in a position to have its underlying function activated and when the underlying function is, in fact, activated. Similarly, the system sets a second icon box property to either a ready state, if the icon box is set to be activated, or an active state, if the icon function has been activated. A repaint method is used to retrieve a new image of the icon wherein the new image is based according to the event effecting the icon. The data examined by the repaint method are the icon identifier and either a first or second property of the icon, depending on the event that occurs. Once the repaint method is invoked, an image is retrieved that is different from the icon image before the event occurred.

In one embodiment, an event message is sent to the icon's parent object when the icon is effected by an event. A pointer movement event message is sent to the parent object each time a pointer enters or exits an icon box. Similarly, an action event message is sent to the parent object each time the icon's underlying function has been activated. In still another embodiment, the image retrieved by the repaint method is either a first, second, third, or fourth icon image.

DESCRIPTION OF THE DRAWINGS

The invention, together with further objects and advantages thereof, may best be understood by reference of the following description taken in conjunction with the accompanying drawings in which.

DETAILED DESCRIPTION OF THE PREFERRED EMBODIMENTS

When designing computer software applications, the application developer has many decisions to make besides those regarding basic application functionality. In recent years, visual appearance and other aesthetic factors have taken an increasingly important role in making computer software distinguishable and more desirable to consumers. The graphical user interface (GUI), an important component in many applications, has evolved to not only improving ease of use but also to enhancing visual appeal. In other words, many application developers now try to not only make their programs easy to use but also pleasant to look at on the display monitor. Indeed, when new versions of many popular commercial software applications are released, they are critiqued not only on their functionality and user friendliness, but also on their screen layout and design.

One way to improve a GUI is by manipulating a menu panel or, as commonly referred to, a toolbar, a significant feature of nearly all GUIs. The toolbar contains icons which represent functions or options available to the application user. The application developer decides which of the application's functions will be presented to the user by an icon in a toolbar (there may be more than one toolbar on the screen at any given time). The present invention relates to improving the appearance of the icon symbols and the "boxes" in which they are contained, often referred to as buttons. It is these buttons that are contained within the toolbar. More specifically, the present invention relates to ways for changing icon images based on user actions such as moving a pointer into or out of an icon.

Figure 1:
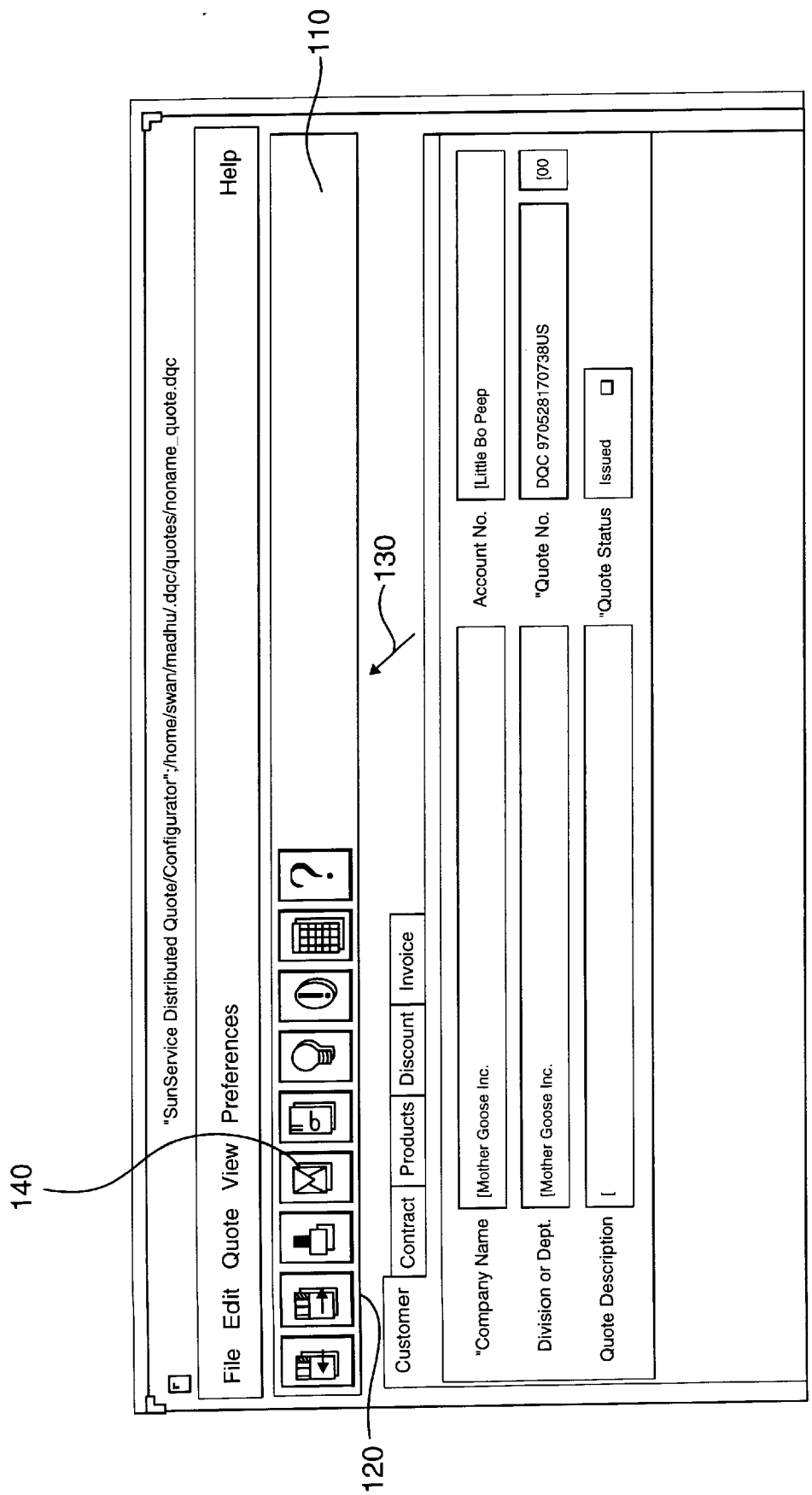
FIG. 1 is a screen shot of a display monitor displaying a toolbar with a plurality of icon boxes or buttons within a user application.

Examples of how an icon image can change according to user actions are illustrated in FIGS. 1 and 2a through 2d. FIG. 1 is a screen shot of a display monitor displaying a toolbar 110 with a plurality of icon boxes or buttons 120 within a user application, in this instance, the "SunService Distributed Quote/Configurator" application. In this example, toolbar 110 is positioned horizontally across the top, but can also be placed vertically along the sides or on the bottom of the screen. Also shown is a pointer 130 positioned outside toolbar 10. Because pointer 130 is not within any of the buttons 120, the buttons 120 are shown in their default images. A default image is one example of an icon image. In FIG. 1 the default image is the "normal" image of a button 140 when the user is not doing anything with the button. A close-up view of button 140 is shown in various forms in FIGS. 2a through 2d.

Figure 2A:
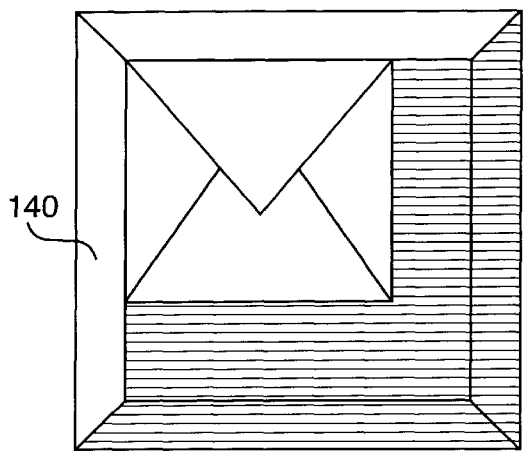
FIGS. 2a through 2d show various images of an icon as determined according to a user's movements and actions of a pointer in relation to the icon.

FIGS. 2a through 2d show samples of various images of button 140 as they change according to a user's movements and actions of pointer 130 in relation to button 140 in the described embodiment. FIG. 2a shows the button in its default image as it is shown in FIG. 1. In this particular example, the application designer chose a default image where the icon symbol—an envelope—appears to be above the background causing a shadow effect (indicated by a darker shading) surrounded by a half-white and half-dark border. The developer could have chosen nearly any type of image using different colors, shapes, and even moving objects.

Figure 2B:
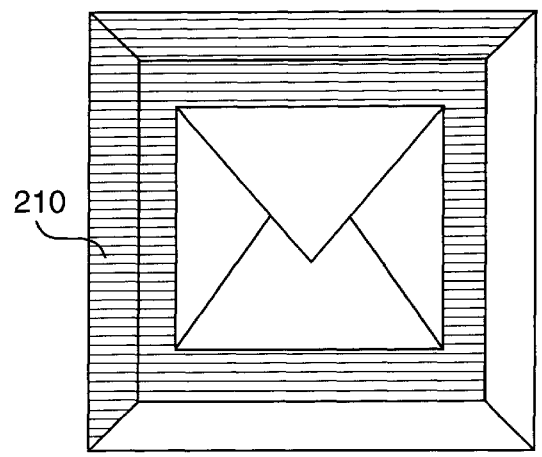
Figure 2C:
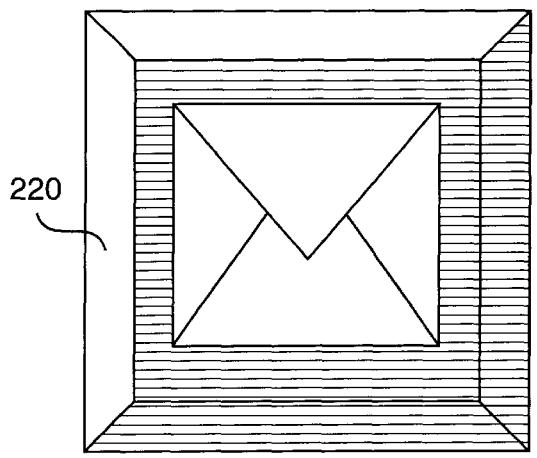

As mentioned above, the icon images change based on user actions. One simple user action is moving a pointer into an icon. FIG. 2b shows an image of button 140 once the user moves a pointer into the icon box. The image is different in that the icon symbol is flat against the background thereby eliminating the shadow effect. The border has changed in that the portion that was dark is now white and vice versa. The application developer may want the icon image to change to help the user locate the pointer or simply to make the toolbar and icons more visually appealing. This image can be any type of image desired by the developer. A method of retrieving the new image from an image file associated with the icon is discussed in further detail with regard to FIG. 4. Once the pointer is in the icon box, one possible user action by the user would be moving the pointer out of the button causing the icon to return to its default image 140 as shown in FIGS. 1 and 2a.

It should be noted that while the example used in the described embodiment employs a pointer controlled by a device such as a mouse, joystick, roller ball, or other pointer-movement hardware device, a pointer is not required. The user can control which icon box to press using other input devices such as a keyboard, a pen-based device, or a touch-screen mechanism.

Figure 2D:
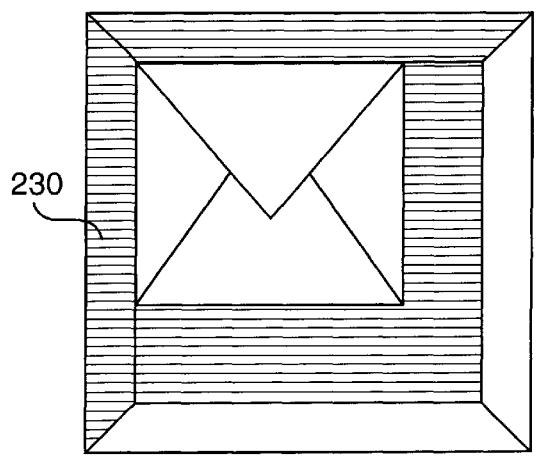

The typical user action once the pointer is in an icon box or button is to activate the underlying function of the button. In the described embodiment where the user is using a mouse to move the pointer, the first step in activating the function is to press a button on the mouse device. By doing this, the user is positioned to activate the function by releasing the button on the mouse (the combined steps of pressing and releasing commonly referred to as "clicking on" the button). The developer can choose to display a different image for the icon following each of these events. Thus, in the described embodiment, once the user sets to activate the function by pressing a button on the mouse, the icon image changes to the image shown in FIG. 2c. This image shows the envelope symbol flat against the background, as in FIG. 2b, with the border shading reversed; that is, where the border was white it is now dark and vice versa. Once the user releases the mouse button thereby activating the icon function, the image changes once again to the image shown in FIG. 2d. The image in FIG. 2d shows the icon symbol lifted up as before thereby creating a shadow effect as in the image shown in FIG. 2a except the border shading is the reverse of that in FIG. 2a.

There are other actions the user may take with regard to the icons and the toolbar which the application developer can consider when deciding whether other images can be used to enhance the efficiency and visual appeal of the GUI. The images shown in FIGS. 2a through 2d are only four examples of what an application developer can choose for displacing icon images. Instead of focusing on different degrees of shading and border design, a developer can focus on other features such as changing colors and shapes or on making the images animated.

Figure 3:
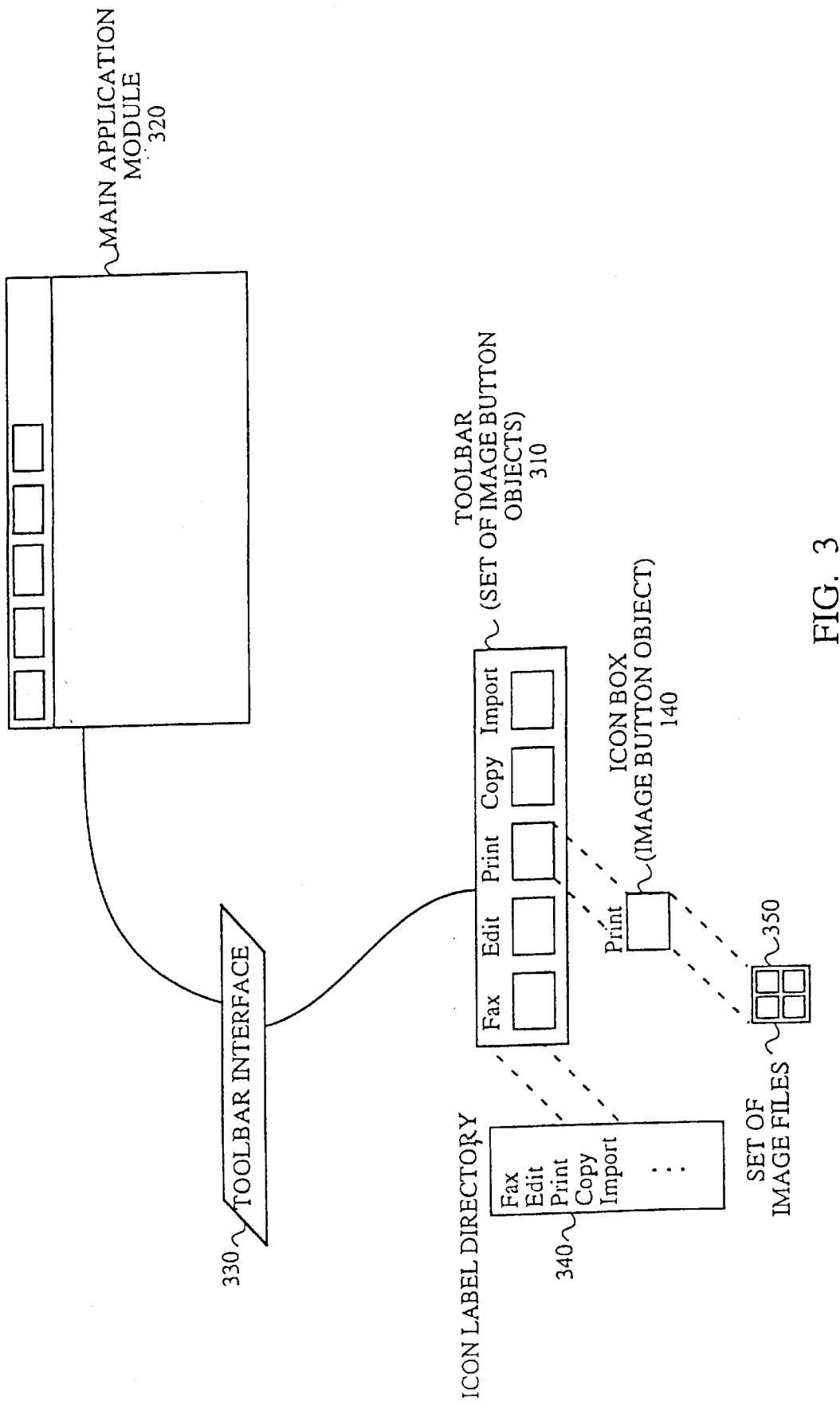
FIG. 3 shows the relationships among the icon, toolbar, and main application, as well as some related files.

FIG. 3 shows the relationships among the icon, toolbar, and main application module, as well as some related files through a single controller in the described embodiment. Icon box or button 140 is an object or instance of the ImageButton class 310 shown in FIG. 3. In one embodiment, button objects of the ImageButton class 310 have an onButton property and a pressedButton property, which can be set to either TRUE or FALSE. In other embodiments, the button objects may have a different pair of properties depending on how or when the application developer chooses to change the icon image. These properties are manipulated and function as global (Boolean) variables since they are properties common to all instances (i.e. objects) of the ImageButton class 310. In addition to having two properties, in the described embodiment each icon object of the ImageButton class can also be in one of three states: pointer_enter, pointer_exit, and action. In other embodiments, an icon object may have more or fewer than three states reflecting what user actions will cause the icon image to change. As will be shown in FIG. 4, the properties, states, and methods of an icon are used in changing the icon image and activating the icon's underlying function.

It should be noted that in the described embodiment, an object-oriented programming environment is used to discuss the present invention. Thus, object-oriented programming constructs such as class, properties, and objects are used to describe how the invention works. However, the method and apparatus described can also be implemented in other programming environments and languages, such as recently defined Internet-related languages or the more conventional top-down structured programming languages. Thus, analogous or similar programming features and constructs found in other languages and environments may be used in lieu of the examples used in the described embodiment.

Returning to FIG. 3, ImageButton class 310 is made up of properties and methods in which an "instance" of the class is an object (i.e. an icon). The underlying data construct of a toolbar, shown as object 110 in FIG. 1, is an ImageButton class, such as class 310 in FIG. 3. The toolbar is a component of the main application module, such as the "SunService Distributed Quote/Configurator" shown in FIG. 1. In FIG. 3, application module 320 is the toolbar's parent object. This is because the user actions taken via the toolbar are communicated to the main application which then carries out the appropriate function. The toolbar and its parent object communicate through a ToolBarInterface 330 which can use certain procedures referred to as methods. In the described embodiment, ToolBarInterface 330 has three methods to execute the dedicated underlying actions regarding the user's action on an icon, plus a dispatch procedure which calls one of these methods to execute an icon function such as Print or Copy. In the described embodiment, the three ToolBarInterface methods are buttonPushed, buttonEntered, and buttonExited. The toolbar uses one of these three methods (i.e. carries out one of the three procedures) when a pointer has entered or exited an icon box or when a mouse or pointer-device button has been pressed while in an icon box. The parameters passed to these methods are the name of the toolbar and the icon box. The method needs to know the name of the toolbar because the toolbar's parent object may have more than one toolbar. The dispatch method is used by the toolbar when an icon's underlying function is activated by a user when the mouse or pointer-device button is released. The dispatch method will carry out steps necessary for the activated function to begin.

Each icon box object 140 (i.e. each button) is given a label by the application developer such as Print or Edit as shown above the icons in the toolbar in FIG. 3. The application developer also specifies the dimension of the toolbar, determines its orientation, creates single or multiple controller(s) with the concerned module(s) and creates an icon label directory 340, as well as other features. The icon label directory 340 contains all the icon labels for the toolbar. The application developer also creates images for each icon—four in the described embodiment—and stores the images in a set of Image Files 350 so they can be accessed when a procedure for refreshing the icon image is invoked. In the described embodiment, the procedure invoked is referred to as a repaint method. The repaint method, discussed in further detail in FIG. 4, changes the appearance of the icon according to the user's actions. The images can be stored in various file formats such as GIF and JPEG. In the present example, each button has four images: pointer-out/button-up (image 140), pointer-in/button-up (image 210), pointer-in/button-pressed (image 220), and pointer-in/button-released (image 230) (note that the button referred to is the button on the mouse or pointer-device). These images are retrieved by the repaint method and used to refresh the icon image when called for by the system.

Figure 4A:
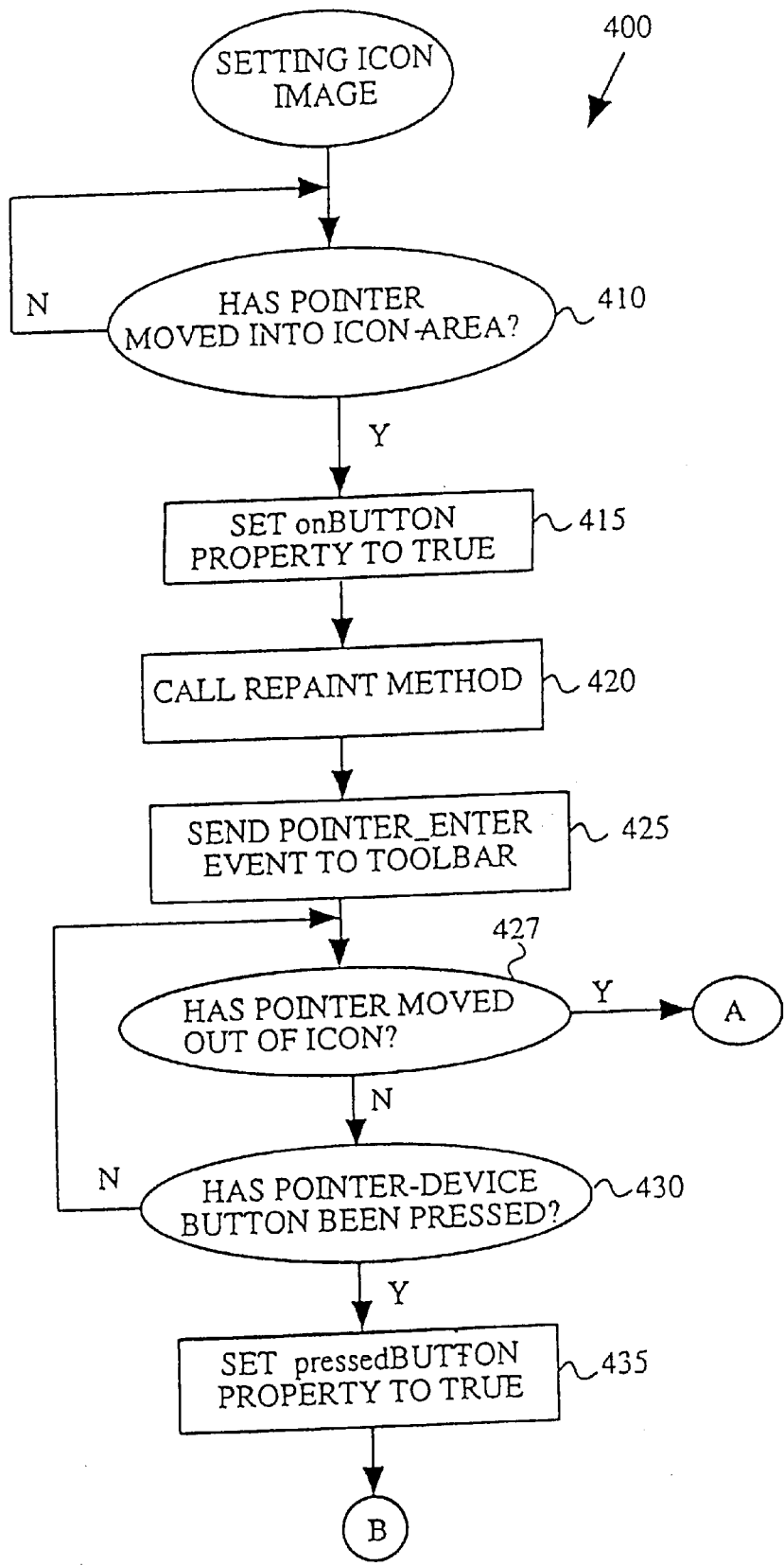
FIG. 4A and FIG. 4B are flowcharts illustrating a method of changing the appearance of an icon box or button in a toolbar in accordance with one embodiment of the present invention.
Figure 4B:
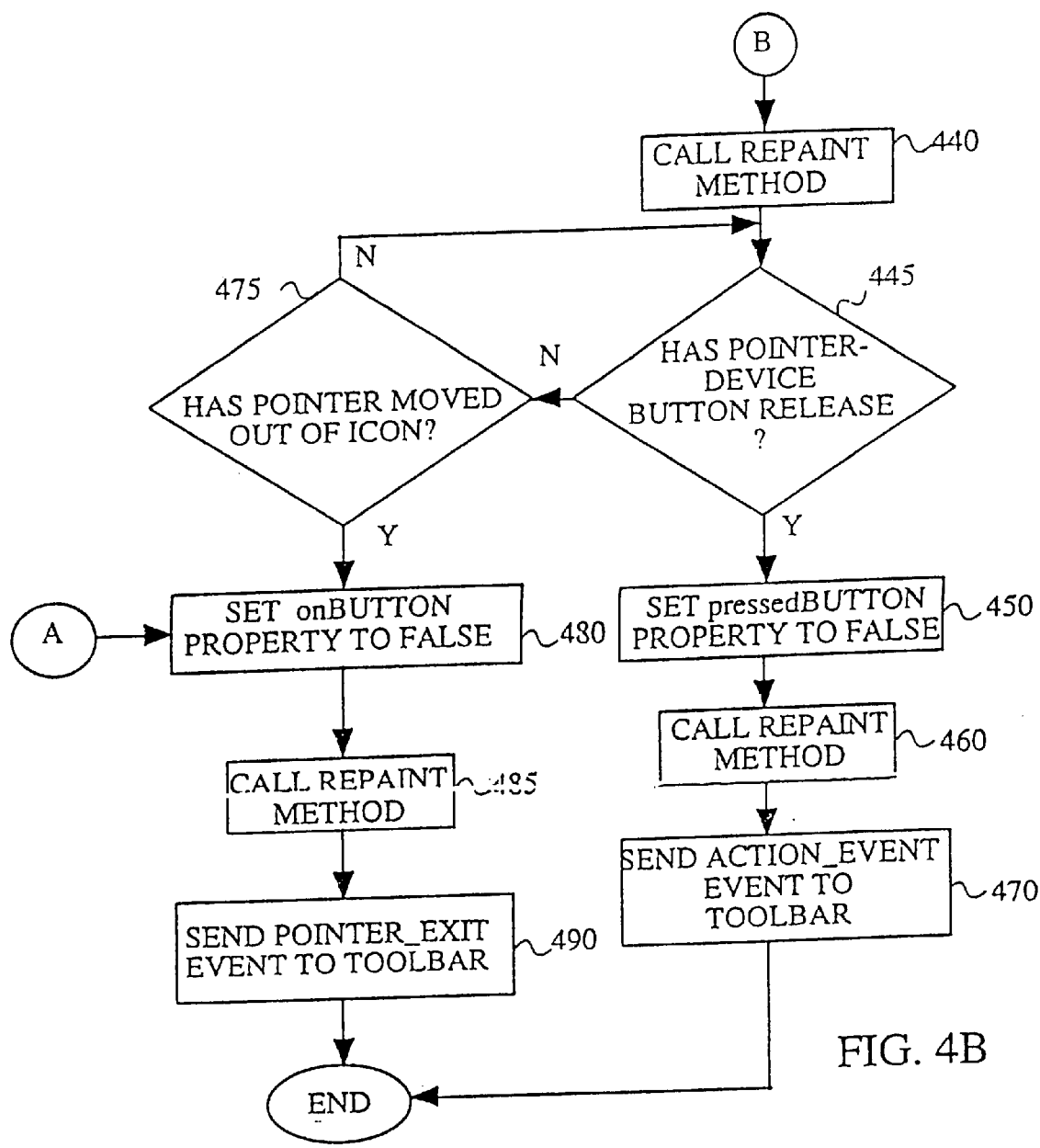

FIG. 4 is a flowchart illustrating a method of changing the appearance of an icon box or button in a toolbar in accordance with the described embodiment of the present invention. In step 410, the system determines whether the user has moved a pointer into an icon box. The pointer can be any indicator or locator on the computer screen whose movement is controlled by the user through a hardware device such as a mouse, roller ball, pointer device, or keyboard. The user chooses an option or function by moving the pointer to an icon contained within a toolbar which represents that option. If the user has moved the pointer into the icon box, the icon changes its default state of pointer_exit to the pointer_enter state. The system informs the toolbar of the pointer_enter state of the icon box 140, at which point the toolbar 310 calls the pointerEnter method of the ToolBarInterface 330. As a result, the onButton property of the icon object is set to TRUE in step 415. If the user has not moved the pointer into an icon, the system continues to check for a user action affecting the icon.

Once the system detects that the onButton property of a particular icon object is TRUE, it will change the appearance of the button by invoking the repaint method in step 420. In the described embodiment, the repaint method will replace the current image of the icon with a different icon image by examining at the state of the icon's properties, which in this example is the onButton property in the TRUE state. In other embodiments, the repaint method can be a procedure that receives certain parameters, such as the icon property state, and will retrieve an icon image based on the information in its parameters. The repaint method operates by retrieving the proper icon image from an Image File (object 350 in FIG. 3) which can be stored in any location accessible by the repaint method. In the described embodiment, the Image File contains four files, but in other embodiments, there may be more or fewer images of the icon. The repaint method looks at the states of the icon and retrieves icon images based on the icon states. In addition to changing the state of the icon and invoking the pointerEnter method, moving the pointer into an icon within a toolbar also triggers sending a POINTER_ENTER event to the toolbar, the parent object of the icon object, as shown in step 425. The POINTER_ENTER event acts as a flag to the toolbar informing it that the pointer has entered one of its icon objects. Once the toolbar receives notice that this event has occurred, the toolbar object can then inform its parent object, typically the main application the user is running (e.g. a word processor or a Java applet in a Web browser), of the event via the ToolBarInterface (object 330 in FIG. 3). As mentioned above, the ToolBarinterface has a dispatch method it can use to send information from the toolbar to the parent object when a pointer enters an icon, such as a buttonEntered procedure or method. Once the pointer has moved into an icon box the system checks to see whether the pointer has been moved out of the icon in step 427. If the pointer has moved out of the icon box, control transfers to step 480 where the onButton property is set to FALSE. Step 480 and subsequent steps are discussed below. Essentially, once the pointer is moved out of the icon box, the repaint method is called and the icon box image is changed to its original or default image. If the pointer has not been moved out of the icon box, the system then checks to see whether the pointer device button has been pressed in step 430.

Once the pointer is in an icon box, the user can invoke the function or option represented by the icon by pressing and releasing a button on, or connected to, the pointer-device. In the described embodiment, the user presses a button on a mouse. Typically, once the pointer is positioned, the user must press a button and then release the button to invoke the icon's underlying function. Thus, by pressing a button on a mouse, the user is preparing to and will be positioned to invoke a particular function. In step 430, the system determines whether the user has pressed the pointer-device button. In the vast majority of instances, the user does this with the intention of invoking the icon's underlying function.

If the pointer-device button is depressed, the pressedButton property of the icon object is set to TRUE in step 435. In addition, the state of the icon object changes from its current pointer_enter state to an action state. If the pointer device button has not been pressed, the system continues checking to see whether the pointer has moved out of the icon and then checks again whether the pointer device button has been pressed, thus repeating steps 427 and 430. In step 440 the repaint method is called again to change the appearance of the icon box by examining the states of the icon, which has its pressedButton property set to TRUE. The image changes from the pointer-in/button-up image to a pointer-in/button-down image. The new image alerts the user that the icon's underlying function is set to be activated and will be activated if the pointer-device button is released while still in the icon box. The user can still bypass activating the icon function by moving the pointer out of the icon box and then releasing the button. This user action is discussed in further detail below.

In step 445, the system checks to see whether the pointer-device button has been released while the pointer is in the icon box. In most instances, the user intends to activate the underlying function and does so by releasing the pointer-device button. Once the button is released, the pressedButton property of the icon object is set to FALSE in step 450. The icon image will then change to the pointer-in/button-released image by calling the repaint method in step 460. The repaint method will retrieve the appropriate image from the image file based on the state of the icon. Once the user releases the pointer-device button and the icon image has changed, an action event flag and the icon label is sent to the toolbar (parent) object in step 470. The toolbar, in turn, uses the ToolBarInterface to inform the main application that an icon function is being invoked initiating a buttonPushed method. This method is in the same class as the buttonEntered method initiated by the ToolBarInterface when the pointer entered an icon. The parameters passed by the ToolBarInterface to the buttonPushed method are the names of the icon and the toolbar since the main application may have more than one toolbar available to the user on the display monitor. Once the underlying function of the icon has been activated, the system carries out the function and the icon image process is complete.

Returning to step 445, if the system determines that the pointer-device button has not been released, it checks to see whether the pointer has moved out of the icon in step 475. This is one way for the user to abort activating an icon's underlying function once the pointer-device button is depressed. If the button is released outside the icon box, the function will not be activated. Once moved out of the icon box, the state of the icon is changed to pointer_exit from pointer_enter. Similar to the steps taken to invoke the pointerEnter method when the pointer moved into the icon box, when a pointer is moved out of the icon box, a pointerExit method is invoked and passed as a parameter the name of the icon. As a result, the onButton property of the icon object is set to FALSE in step 480.

Once the onButton property is set to false, the repaint method is invoked in step 485. The repaint method changes the appearance of the button to its original or default image in step 485. In addition to changing the state of the icon and invoking the buttonExited method, moving the pointer out of an icon within a toolbar also triggers sending a POINTER_EXIT event to the toolbar as shown in step 490. Once the toolbar is notified that this event has occurred by receiving the POINTER_EXIT event, the toolbar object will notify the main application (its parent object) of the event via the ToolBarInterface. This is done by invoking a buttonExited method or procedure, similar to the buttonPushed and buttonEntered methods invoked discussed above. Once the pointer has moved out of the icon box, the icon image processing of the described embodiment is complete. The system can be configured such that user actions other than those described will also change the icon image.

The present invention employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should remembered, however, that all of these and similar terms are to be associated with the appropriate physical quantities and are merely convenient labels applied to these quantities.

Further, the manipulations performed are often referred to in terms, such as identifying, running, executing, downloading, or detecting. In any of the operations described herein that form part of the present invention, these operations are machine operations. Useful machines for performing the operations of the present invention include general purpose digital computers or other similar devices. In all cases, it should be borne in mind the distinction between the method of operations in operating a computer and the method of computation itself. The present invention relates to method steps for operating a computer in processing electrical or other physical signals to generate other desired physical signals.

The present invention also relates to a computer system for performing these operations. This computer system may be specially constructed for the required purposes, or it may be a general purpose computer selectively activated or reconfigured by a computer program stored in the computer. The processes presented herein are not inherently related to any particular computer or other computing apparatus. In particular, various general purpose computing machines may be used with programs written in accordance with the teachings herein, or it may be more convenient to construct a more specialized computer apparatus to perform the required method steps.

Figure 5:
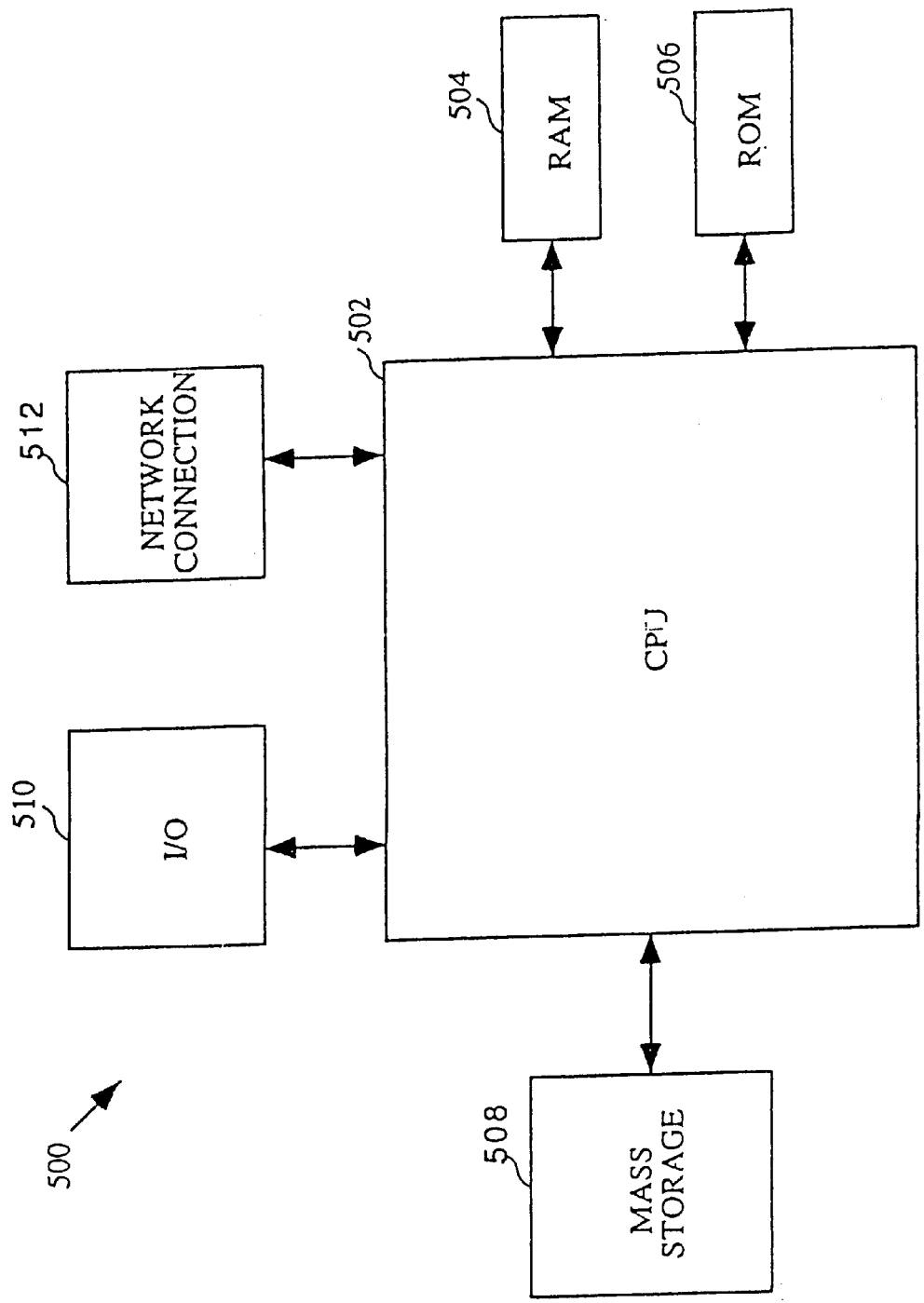
FIG. 5 is a schematic illustration of a general purpose computer system suitable for implementing the present invention.

FIG. 5 is a schematic illustration of a general purpose computer system suitable for implementing the present invention. The computer system includes a central processing unit (CPU) 502, which CPU is coupled bidirectionally with random access memory (RAM) 504 and unidirectionally with read only memory (ROM) 506. Typically RAM 504 includes programming instructions and data, including text objects as described herein in addition to other data and instructions for processes currently operating on CPU 502. ROM 506 typically includes basic operating instructions, data and objects used by the computer to perform its functions. In addition, a mass storage device 508, such as a hard disk, CD ROM, magneto-optical (floptical) drive, tape drive or the like, is coupled bidirectionally with CPU 502. Mass storage device 508 generally includes additional programming instructions, data and text objects that typically are not in active use by the CPU, although the address space may be accessed by the CPU, e.g., for virtual memory or the like. Each of the above described computers further includes an input/output source 510 that typically includes input media such as a keyboard, pointer devices (e.g., a mouse or stylus) and the like. Each computer can also include a network connection 512 over which data, including, for example, objects, files, and instructions, can be transferred. Additional mass storage devices (not shown) may also be connected to CPU 502 through network connection 512. It will be appreciated by those skilled in the art that the above described hardware and software elements are of standard design and construction.

Although only a few embodiments of the present invention have been described, it should be understood that the present invention may be embodied in many other specific forms without departing from the spirit or the scope of the present invention. For example, there may be more or fewer than four icon images for each icon corresponding to different user actions. The icon images may be static, as in the described embodiment, or dynamic. Similarly, there may be more or fewer than three states for an icon representing various user actions. There may also be more or fewer than three procedures used to communicate between the toolbar and the main application. In another example, although the present invention has been described using object-oriented programming features and constructs, the invention may be implemented using other types of programming environments and languages, namely, the more conventional top-down structured languages such as the "C" programming language. Therefore, the described embodiments should be taken as illustrative and not restrictive, and the invention should be defined by the following claims and their full scope of equivalents.

What is claimed is:

1. In a computer system that includes a display monitor that is configured to display a toolbar that contains an icon box, a method for altering the appearance of the icon box to indicate that an event effecting the icon box has occurred, the method comprising:

detecting when a pointer enters an icon box and setting a first property to an onbutton state when the pointer enters the icon box;

detecting when a pointer exits the icon box and setting the first property of the icon box to an offbutton state when the pointer exits the icon box;

detecting when the icon box is set for function activation and setting a second property of the icon box to a ready state when the icon box is set for activation;

detecting when the icon box's function is activated and setting the second property of the icon box to an active state when the icon box is activated; and calling a repaint method each time the pointer enters an icon box, each time the pointer exits an icon box, each time an icon box is set for activation, and each time an icon box has been activated, wherein when the repaint method is called, an icon identifier and at least an associated one of the properties is examined by the repaint method to facilitate identification of a refresh image that is then displayed in the icon box;

utilizing a set of foreground images including two icon box foreground images and a set of background images including two icon box background images wherein the refresh image is taken from one of the set of foreground images and the set of background images; and utilizing a toolbar interface, at least one parent object, and at least one toolbar object, wherein the toolbar interface includes a plurality of specific methods defined by the parent object and the toolbar object includes a plurality of icon box objects, and whereby a parent object instantiates a toolbar object and the toolbar object uses the plurality of specific methods to notify the parent object of a new status of an icon box object;

whereby the two icon box foreground images and the two icon box background images are provided to indicate different status's of the icon box thereby causing the icon box to be repainted to display a refresh image in the icon box that is different from an image displayed prior to the detection of an event.

2. A method as recited in claim 1 further including:

sending a pointer movement event to a parent object each time a pointer enters an icon box and each time a pointer exits an icon box.

3. A method as recited in claim 2 wherein the pointer movement event is a pointer enter event if a pointer enters an icon box and is a pointer exit event if the pointer exits an icon box.

4. A method as recited in claim 1 further including:

sending an action event to a parent object each time an icon box's underlying function has been activated.

5. A method as recited in claim 1 wherein the image retrieved by the repaint method is one of the two icon box foreground images and the two icon box background images.

6. A computer system for altering the appearance of an icon box in a toolbar to indicate that an event effecting the icon box has occurred, the computer system comprising:

an icon box border detection mechanism for detecting each time a pointer has one of entered an icon box and exited an icon box and setting a first property to an onbutton state when the pointer enters the icon box and setting the first property to an offbutton state when the pointer exits the icon box;

an icon box activation mechanism for detecting when the pointer is one of set to activate the icon box and has activated the icon box and setting a second property to a ready state when the pointer is set to activate the icon box and setting the second property to an active state when the pointer activates the icon box's underlying function; and an icon repaint mechanism that changes an icon image each time the pointer enters an icon box, each time the pointer exits an icon box, each time an icon box is set for activation, and each time an icon box has been activated, wherein when the repaint mechanism examines an icon identifier and at least an associated one of the properties to facilitate identification of a refresh image to be displayed in the icon box;

a set of foreground images including two icon box foreground images and a set of background images including two icon box background images wherein the refresh image is taken from one of the set of foreground images and the set of background images; and a toolbar interface, at least one parent object, and at least one toolbar object, wherein the toolbar interface includes a plurality of specific methods defined by the parent object and the toolbar object includes a plurality of icon box objects, and wherein a parent object instantiates a toolbar object and the toolbar object uses the plurality of specific methods to notify the parent object of a new status of an icon box object;

where the image is different from an image displayed prior to the detection of an event and whereby the two icon box foreground images and the two icon box background images are provided to indicate different status's of the icon box.

7. A computer system as recited in claim 6 further including:

a pointer event transmission mechanism for sending a pointer movement event to the parent object each time a pointer enters an icon box and each time a pointer exits an icon box.

8. A computer system as recited in claim 7 wherein the pointer event transmission mechanism sends a pointer enter event to the parent object if a pointer enters an icon box and sends a pointer exit event to the parent object if a pointer exits an icon box.

9. A computer system as recited in claim 6 further including:

an action event transmission mechanism for sending an action event to the parent object each time an icon box's underlying function has been activated.

10. A computer system as recited in claim 6 wherein the image retrieved by the repaint mechanism is one of the two icon box foreground images and the two icon box background images.

11. In a computer system that includes a display monitor that is configured to display a toolbar that contains an icon box, a method for altering the appearance of the icon box to indicate that an event effecting the icon box has occurred, the method comprising:

detecting that an event effecting the icon box has occurred;

setting a property associated with the icon box to indicate that the event has occurred;

calling a repaint method and passing to the repaint method an icon identifier and the property associated with the icon box, to cause the icon box to be repainted thereby displaying a refresh image in the icon box that is different compared to an image displayed in the icon box prior to the detection of the event;

utilizing a set of foreground images including two icon box foreground images and a set of background images including two icon box background images wherein the refresh image is taken from one of the set of foreground images and the set of background images; and utilizing a toolbar interface, at least one parent object, and at least one toolbar object, wherein the toolbar interface includes a plurality of specific methods defined by the parent object and the toolbar object includes a plurality of icon box objects, and whereby a parent object instantiates a toolbar object and the toolbar object uses the plurality of methods to notify the parent object of a new status of an icon box object;

whereby the two icon box foreground images and the two icon box background images are provided to indicate different status's of the icon box thereby causing the icon box to be repainted to display the refresh image in the icon box that is different from an image displayed prior to the detection of an event.

* * * * *